United States Patent [19]
Vollmer

[11] Patent Number: 5,154,253
[45] Date of Patent: Oct. 13, 1992

[54] ARRANGEMENT OF A FRONT-MOUNTED DRIVE UNIT IN A MOTOR VEHICLE

[75] Inventor: Elmar Vollmer, Wettstetten, Fed. Rep. of Germany

[73] Assignee: Audi AG, Fed. Rep. of Germany

[21] Appl. No.: 833,825

[22] Filed: Feb. 12, 1992

Related U.S. Application Data

[63] Continuation of Ser. No. 536,557, Jul. 19, 1990, abandoned.

[30] Foreign Application Priority Data

Jan. 19, 1988 [DE] Fed. Rep. of Germany ........... 3801347
Oct. 28, 1988 [EP] European Pat. Off...PCT/EP88/00972

[51] Int. Cl.$^5$ ..................... B60K 5/12; B60R 21/00; B62D 1/18
[52] U.S. Cl. ..................... 180/274; 74/492; 74/493; 180/232; 280/734; 280/777; 280/806
[58] Field of Search ............ 180/232, 271, 274; 280/748, 750, 777, 801, 806, 807, 734; 74/492, 493

[56] References Cited

U.S. PATENT DOCUMENTS

| | | | |
|---|---|---|---|
| 3,412,628 | 11/1968 | De Gain | 280/748 |
| 3,805,911 | 4/1974 | Le Salver | 180/232 |
| 3,815,703 | 6/1974 | De Lorean et al. | 180/232 |
| 3,888,502 | 6/1975 | Felzer et al. | 280/784 |
| 3,903,982 | 9/1975 | Van Winsen et al. | 180/232 |
| 4,402,380 | 9/1983 | Strong | 180/292 |
| 4,795,189 | 1/1989 | Vollmer et al. | 180/274 |

Primary Examiner—Mitchell J. Hill
Attorney, Agent, or Firm—Lalos & Keegan

[57] ABSTRACT

In a motor vehicle having a body and a drive unit consisting of an engine and transmission provided with forwardly disposed support mounts secured forwardly thereof to the vehicle body, a drive unit rear end support assembly comprising a member mounted on the vehicle body providing a bearing surface and a support member rigidly secured to the drive unit, extending rearwardly therefrom and resting on the bearing surface.

8 Claims, 1 Drawing Sheet

ARRANGEMENT OF A FRONT-MOUNTED DRIVE UNIT IN A MOTOR VEHICLE

This is a continuation of copending application Ser. No. 07/536,557 filed on Sep. 19, 1990 now abandoned.

BACKGROUND OF THE INVENTION

This invention relates to a design for a front-mounted drive unit consisting of engine and transmission in a motor vehicle, wherein the bottom of the body is designed with a tunnel-shaped axial longitudinal runner or housing into which an end of a drive unit facing the passenger compartment extends and wherein the drive unit is provided with a bearing and support assembly.

In a known support system for a drive unit as disclosed in West German patent application, Ser. No. 25 06 303, consisting of an internal combustion engine with a flange-mounted transmission, the internal combustion engine is mounted on both sides. The flange-mounted transmission projects into an axial tunnel and in its central area is supported at the bottom so that in the aggregate a three-point support is formed for the drive assembly. For settled support characterized by slight movement of the drive unit and greater comfort, the base of the support points should be as large as possible, a feature susceptible of further improvement in this case.

Allowing the drive unit to extend into the axial longitudinal runner in the event of a frontal collision with high collision energy, and thus absorption of collision energy by means of deformation, is also known. Sufficient energy, however, cannot be absorbed with the known design in the event of a collision at very high speed and with very high collision energy.

It often is noted in a violent frontal collision that the driver's head strikes the steering wheel despite the fact that the driver is wearing his safety restraining belt. This is caused by violent forward displacement of the upper body and head of the driver or additionally by the fact that in a frontal collision, the steering wheel is displaced into the passenger compartment by the steering column.

In addition, safety belts with conventional automatic devices are locked in their unwinding mechanism only after travelling a short acceleration path, as a result of which a dangerously violent forward displacement of an additional passenger as well as of the driver can occur. A substantial improvement in this problem is achieved by means of a safety appliance as disclosed in West German patent application, Ser. No. 16 55 597 known as the PROCON-TEN system. In the case of this safety device both the steering wheel and the safety belt mechanism are connected by cables that are connected by way of a guide device to the drive unit or a "cable grab" on the drive unit. If the drive unit is displaced rearwardly toward the passenger compartment in a violent frontal collision, the steering wheel is deflected from the potential head impact area in the direction of the dashboard and the safety belt is simultaneously tightened. To obtain a suitable installation for the cable guide, the cable grab is situated a relatively great distance toward the passenger compartment on the transmission. Considering the large number of vehicle models and the option of selecting different drive assemblies and internal combustion engine and transmission versions, it is apparent that the cable grab over which the cables fastened to them is mounted in different places in different vehicle models. Accordingly, different cable lengths, with the attendant disadvantages of higher production costs, higher mounting support costs, etc., are required for different vehicle versions.

It accordingly is the principal object of the invention to further develop a design of a front-mounted drive unit in such a manner that a bearing and support means suitable for multiple applications is available on the drive unit.

SUMMARY OF THE INVENTION

In one embodiment of the invention, the bearing and support means comprises a tubular support member projecting into the axial longitudinal runner as an extension of the drive unit. Inasmuch as in conventional vehicle designs with a drive assembly consisting of an internal combustion engine with a transmission flange-mounted on it, the transmission extends in the direction of the passenger compartment, the tubular support is usually made as an extension of the transmission housing. In another known drive unit configuration, the internal combustion engine and the transmission are separated and are mounted separately in a front and a rear area of the vehicle connected by an axial tube. This axial tube may also be used as the tubular support within the scope of the present invention.

In principle, the tubular support may have any desired cross-sectional configuration and may also be made of a solid material for different applications. It is preferred, however, that a round or square cross-section of a hollow pipe be used which provides the advantages of high energy absorption by deforming in an accordion manner by crimping, cost-effective manufacture and processing and desirable low weight.

The connection between the drive unit or transmission housing and the tubular support must be a rigid one because of the bearing and support function of the tubular support. Accordingly, another embodiment of the present invention provides that the tubular support either be directly cast on the drive unit or inserted into and/or bolted onto it.

The tubular support is used advantageously in conjunction with the safety arrangement referred to above for displacing the steering wheel and pretensioning the safety belt. The cable grab or hook about which the cable passes or is reeved is for this purpose mounted on the tubular support so as to be adjustable longitudinally and capable of being locked in position. Consequently, the same cable lengths may be used for all vehicle modifications with different internal combustion engines or different transmissions. The cables are adjusted for tightening by moving the cable grab or hook on the tubular support and then locking it in position, the length of the tubular support serving as the adjustment length. This provides the advantage of standardization of cable lengths providing known cost reductions for standard parts in manufacture, support positioning, customer service and so forth.

In another embodiment of the invention, the tubular support is reinforced with a torque bearing mounted in the axial longitudinal runner, providing the drive unit with a sufficiently large base for the bearing points. Such an arrangement is preferred when the tubular support is reinforced far at the rear at its free end, in the torque bearing. This provides a quiet mounting of the drive unit, with low vibrations and thus an increase in passenger comfort.

In a further embodiment of the invention, it is provided that the tubular support be designed in such a manner that when it is subjected to the action of a force on its longitudinal axis, it undergoes controlled deformation and crimping so that much energy can be absorbed. A bracket or support is provided in the axial longitudinal runner which is very rigid in design and provides an abutment surface engageable by the tubular support in the event of a violent frontal collision resulting in a rearward displacement of the drive unit. The tubular support is deformed by crimping in the process and absorbs a certain amount of the collision energy. This provides on the one hand to in an advantageous overall increase in energy absorption and on the other in the advantage that rearward displacement of the drive unit and penetration of the passenger compartment is delayed.

DETAILED DESCRIPTION OF THE PREFERRED EMBODIMENTS.

Figure 1:
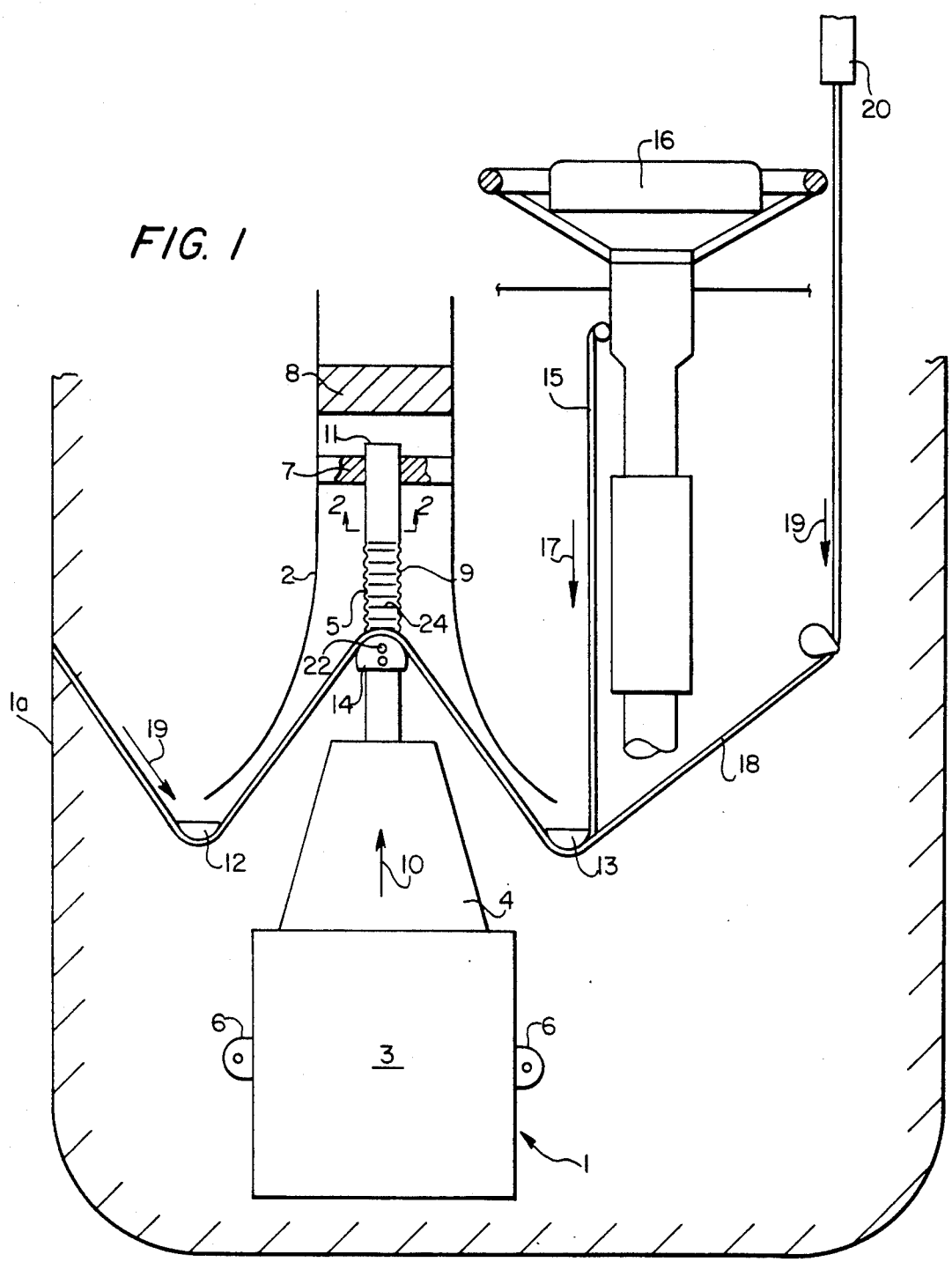
FIG. 1 of the drawing illustrates a configuration of a front-mounted drive unit with an extension in the form of a tubular support on which a cable grab or hook is adjustably mounted and which functions to support the drive unit.
Figure 2A:
FIGS. 2A and 2B show alternative embodiments of the tubular support of FIG. 1, taken along line 2—2 of FIG. 1.
Figure 2B:
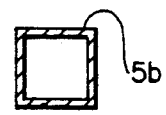

The embodiment shown in FIG. 1 includes a front-mounted drive Unit 1 in a motor vehicle having a body 1a, in which the bottom of the body is provided with a tunnel-like axial longitudinal runner or housing 2. The drive unit 1 consists of an engine 3 with a transmission 4 flange-mounted thereon. The transmission 4 or its housing has an extension in the form of a tubular support member 5, extending in the longitudinal direction of the vehicle. Tubular support member 5 may be of a circular cross-sectional configuration, as shown in FIG. 2A, or may be of a square cross-sectional configuration, as shown in FIG. 2B. Both the end of the drive unit facing the passenger compartment and the extension in the form of the tubular support member 5 extend into the axial longitudinal runner 2.

The drive unit 1 consisting of engine 3 and transmission 4 is supported by two engine mounts 6 mounted on each side of the engine and by a torque bearing 7 mounted in the axial longitudinal runner 2. The free end of the tubular support member 5 extends into the torque bearing 7 and is flexibly supported therein. The engine mounts 6 and the torque bearing 7 comprise for the most part rubber-and-metal elements, with liquid-filled damping chambers. The base for support of the drive unit 1 is made as large as desired by means of the third bearing point displaced far to the rear by way of the tubular support member 5 in the direction of the passenger compartment. This results in an acoustically advantageous support of the drive unit with attendant slight drive unit movements and increased passenger comfort.

A bracket 8 in the form of a metal plate is mounted in the axial longitudinal runner 2 behind the torque bearing 7. The tubular support member 5 is round (shown as 5A in FIG. 2A) or square (shown as 5B in FIG. 2B) in cross-section and is designed specifically for deformation by crimping if a force in the axial direction is applied to the tubular support member 5. The intended deformation by crimping in an accordion or pleating manner is indicated diagrammatically by indentations 9.

In the event of a substantial frontal collision, the drive unit 1 and thus the tubular support member 5 will be caused to be displaced toward the passenger compartment as indicated by the arrow 10. The free end 11 of the tubular support member 5 will contact the bracket 8 and deform in a crimping manner as it absorbs collision energy.

Two deflection or reeving elements 12 and 13 are rigidly mounted to the left and right sides of the transmission 4. Another deflection or reeving element is secured to the tubular support member 5 as a cable grab or hook 14. A cable 15 is fastened on the steering wheel 16 and extends by way of the deflection element 13 and the cable grab 14 to the deflection element 12 and is anchored the vehicle body. In the event of a severe frontal collision in which the drive unit 1 is displaced in the direction of the arrow 10 relative to the body, one end of the cable 15 remains secured in the area of the deflection element 12, the cable grab 14 is displaced in the direction of the passenger compartment, and the deflection element 13 also remains secured on the body. Consequently, the cable 15 on the steering wheel 16 is drawn in the direction of the arrow 17 and accordingly the steering wheel 16 is displaced laterally from the impact area of the head of the driver of the vehicle.

Another cable 18 is connected to conventional safety restraining belts (20). This cable 18 also extends by way of the deflection elements 12 and 13 and the cable grab 14 (in FIG. 1 the cables 15 and 18 on the deflection elements 12 and 13 and on the cable grab 14 are diverted vertically, perpendicular to the plane of the drawing). If the drive unit 1 is moved in the direction of the passenger compartment in a violent frontal collision, cable movement takes place along the arrow 19, as a result of which the safety belts 20 are tightened by way of the cable 18.

For purposes of adjustment and tensioning of the cables 15 and 18, the cable grab or hook 14 is mounted so that it may be displaced along the tubular support member 5 and can be locked in position, for example, by means of bolts, 22 in a serration 24 on the tubular support member 5. However, the cable grab 14 may also be locked on the tubular support member 5 by other means, such as clamping, wedging or welding after adjustment. It nevertheless is advisable for the total potential displacement path to be situated in a forward area on the tubular support member 5 facing the transmission 4, so that in any event an adequate path will remain for the cable grab 14 for movement of the cables 17 and 18.

In summary, the extension of the drive unit 1 in the form of the tubular support member 5 performs the threefold function of providing a means of longitudinally adjusting cable grab 14, a bearing element for support of the drive unit 1 and an energy absorbing collision element.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a motor vehicle having a body (1A) and a drive unit (1) consisting of an engine (3) and transmission (4) mounted thereon, a drive unit support assembly comprising:

a bearing (7) mounted on said body and a support member (5) extending from said drive unit, said support member extending rearwardly from said drive unit and into said bearing;

a cable grabbing means (14) secured to said support member, a cable reeving means (12, 13) rigidly secured to said body, and a cable (15) secured at one end thereof to a steering column (16) said cable extending around said cable grabbing means and said cable reeving means, and thereafter secured to said body (1a) whereby upon a frontal collision of said vehicle and a corresponding rearward displacement of said drive unit, said cable will be drawn by said drive unit rearward displacement and will correspondingly displace said steering column longitudinally forwardly; and means for adjustably mounting said cable grabbing means on said support member whereby said cable grabbing means is displaceable along said support member to accommodate drive units of differing sizes.

2. An assembly according to claim 1 wherein said support member is tubular.

3. An assembly according to claim 1 wherein said support member has a square cross-sectional configuration.

4. An assembly according to claim 1 including bracket means (8) rigidly secured to said body whereby upon said frontal collision and corresponding rearward displacement of said drive unit, a free end (11) of said support member contacts said bracket means.

5. An assembly according to claim 4 wherein said support member is deformable upon rearward displacement thereof and engagement with said bracket means for absorbing collision energy.

6. An assembly according to claim 5 wherein said support member is capable of deforming in a crimping manner in absorbing said collision energy.

7. An assembly according to claim 1 wherein said bearing (7) is a torque bearing and said support member is supported in said torque bearing.

8. An assembly according to claim 1 further comprising a second cable (18) secured at one end thereof to a passenger restraining belt (20), said second cable extending around said cable grabbing means and said cable reeving means whereby upon said frontal collision of said vehicle, said second cable will be drawn by said drive unit rearward displacement, resulting in the tightening of said passenger restraining belt.

* * * * *